Dec. 1, 1931.  R. DEPRIESTER  1,834,271
POWER SUPPLY APPARATUS FOR ELECTRON TUBES
Filed Feb. 5, 1924  3 Sheets-Sheet 1

Inventor
Raymond DePriester
By Robt Robertsel
Attorney

Dec. 1, 1931.   R. DEPRIESTER   1,834,271
POWER SUPPLY APPARATUS FOR ELECTRON TUBES
Filed Feb. 5, 1924   3 Sheets-Sheet 2

Inventor
Raymond Depriester
By Robb Robb & Hill
Attorneys

Dec. 1, 1931.    R. DEPRIESTER    1,834,271
POWER SUPPLY APPARATUS FOR ELECTRON TUBES
Filed Feb. 5, 1924    3 Sheets-Sheet 3

Patented Dec. 1, 1931

1,834,271

UNITED STATES PATENT OFFICE

RAYMOND DEPRIESTER, OF PARIS, FRANCE, ASSIGNOR TO INTERNATIONAL COMMUNICATIONS LABORATORIES INC., OF NEW YORK, N. Y., A CORPORATION OF NEW YORK

POWER SUPPLY APPARATUS FOR ELECTRON TUBES

Application filed February 5, 1924, Serial No. 690,853, and in France February 10, 1923.

My invention relates to methods and means whereby audions may be supplied by alternating current, and even by a commercial or power supply alternating current. It relates to all suitable uses of audions, but chiefly to the filament heating of audions employed either as one-way or two-way amplifiers of the low frequency type. In the means and methods which will be described hereinafter, the alternating current can be used to heat the filament as well as for the suitable polarization of the grid and the supply of the anode at an adjustable voltage, the audion being of the usual commercial types.

When attempts are made to use alternating current for the purpose above stated without other precautions, one perceives in the reproducer or receiver connected in the filament-plate circuit a more or less pronounced rumbling or humming noise, this being chiefly due to the fact that the mean potential of the grid varies with respect to the potentials at the different points of the cathode, by reason of the ohmic fall of potential produced along the filament and also by reason of the variation of temperature along the said cathode.

A filtering method can be used in order to prevent the current causing the said noise from passing through the listening device or receiver; this can be readily carried out in the case of high frequency current amplifiers or "radio-amplifiers", but it becomes much more difficult in the case of the low frequency amplifiers or "audion amplifiers", and chiefly in the case of "repeaters".

For this reason it has been attempted to counteract the causes of the said noise, to which end either a connection effecting the return of the electronic circuits to the middle of the filament, or cathodes having a high thermic inertia have been used.

But in spite of these precautions, a considerable noise is always heard in the reproducer. According to my discoveries, the noise is due to the presence of a fluctuating current in the filament-grid circuit resulting from a bending or distortion of the characteristic curve of the grid-circuit, and to the effect of this parasitic current upon the filament-plate circuit as soon as the external impedance (for this parasitic current) in the filament-grid circuit rises above zero. The question therefore relates to an indirect influence of the variations of the mean potential in the grid with respect to the potentials at the different points of the filament, upon the output or filament-plate circuit, this indirect influence being felt even when the grid return circuit is brought to the middle of the filament and the operation takes place in the straight parts of the filament-plate characteristic curve.

In my invention, the said drawback is obviated by acting upon the impedance of the filament-grid circuit in order to annul the same, or upon the potential of the grid by negatively polarizing it so as to annul the filament-grid current which polarization is effected by power derived from the common alternating current source. These two means can be further combined, and thus the impedance can be acted upon to a less degree, if at the same time the grid is negatively polarized or care is taken to regulate the voltage of the plate in order to work the audion upon the straight part of the characteristic curve of the plate current-grid potential relation, this being effected for example by regulating the heating of the filament of a rectifying audion employed for supplying current to the plate circuit.

By eliminating the rumbling or humming noise in accordance with my invention, the following advantages are obtained:

1. Alternating current can be used not only for heating the filament but also for the supply of all the anode circuits, including the supply for polarizing the grids.

2. Primary batteries and storage batteries are eliminated, using simply various transformers and rheostats adapted for heating the filament.

3. The different anode and cathode circuits of the same apparatus can be individually supplied.

In the first place, a method of negative polarization of the grid will be described. This polarization by the alternating current itself can be obtained by producing in the common return circuit from the grid and plate to the filament a suitable drop in potential by the use of a resistance; but in this case it becomes necessary to eliminate the reaction effect and consequently the regenerative effect which would be produced by the drop in the circuit conducting the amplified current. This is carried out by shunting the resistance by a condenser which reduces the impedance of this arrangement. With this characteristic circuit arrangement (resistance and condenser connected in parallel in the common return circuit of the grid and plate to the filament) I am enabled to polarize the grid under varying conditions either with continuous or alternating current supply.

Further, in order to use alternating current for the supply of the plate, this current may simply be rectified by means of a rectifier such as a thermionic discharge device followed by a filter.

Figure 1:
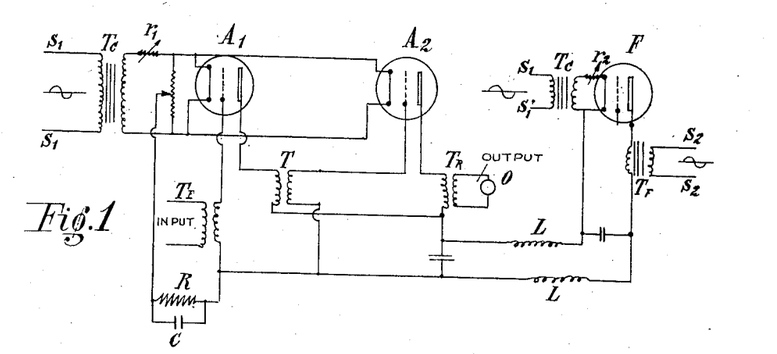
Fig. 1 shows a circuit arrangement for amplifiers embodying the principle of this invention.

Figure 1 shows an arrangement of a low frequency two-stage amplifier wherein the above-mentioned method is carried into effect.

At $S_1 S_1$ is observed the source of alternating current supply for the heating of the two filaments of two amplifiers $A_1 A_2$ and a rectifying audion $F_1$ by means of two transformers $T_0$. At $S_2 S_2$ is indicated a source of alternating current supply connected with the primary of a transformer $T_t$, the secondary winding of which has one terminal connected to the plate of the rectifying audion F (whose filament is connected to the plates of $A_1 A_2$) and the other terminal connected to the grids of $A_1 A_2$.

At $T_E$ is the input transformer acting upon the grid of $A_1$, at T is the coupling transformer between the plate of $A_1$ and the grid of $A_2$, and at $T_R$ is the output coupling transformer, with the reproducer O suitably disposed. Two adjustable rheostats $r_1 r_2$ regulate the heating of the filaments and two self-induction coils L are optionally mounted upon the filter.

At R and C, the arrangement of the resistance and condenser connected in parallel enables the polarization of the grid without regeneration. I reduce, on the other hand, the impedance of the grid circuits by using coupling transformers without leakage or by shunting the windings of said transformers by suitable self-induction coils or resonance circuits.

By the adjustment of the two heating resistances $r_1 r_2$ I am enabled to suppress the rumbling noise which is also less perceptible when the receiver O is replaced by a loud-speaking apparatus. With the use of differential coils, one may obtain a two-way action and provide a two-way amplifier applicable to telephone lines while entirely suppressing the rumbling noise of the alternating current. In addition to the example mentioned, it is obvious that the method of suppression of this noise can be used in all arrangements in which audions are employed.

While in Figure 1 the common return is shown connected to a middle point of the potentiometer resistance of $A_1$, this connection is not to be made exactly at the middle point as in the known methods, i. e. at what is termed the equipotential point of the ends of the filament, but at the point of thermionic symmetry of the filament which is to be found by adjustment. Experience proves that the point thus found differs but little from the middle point. The differences observed do not exceed 10% of the length of the filament.

Figures 2, 9, 10, 12:
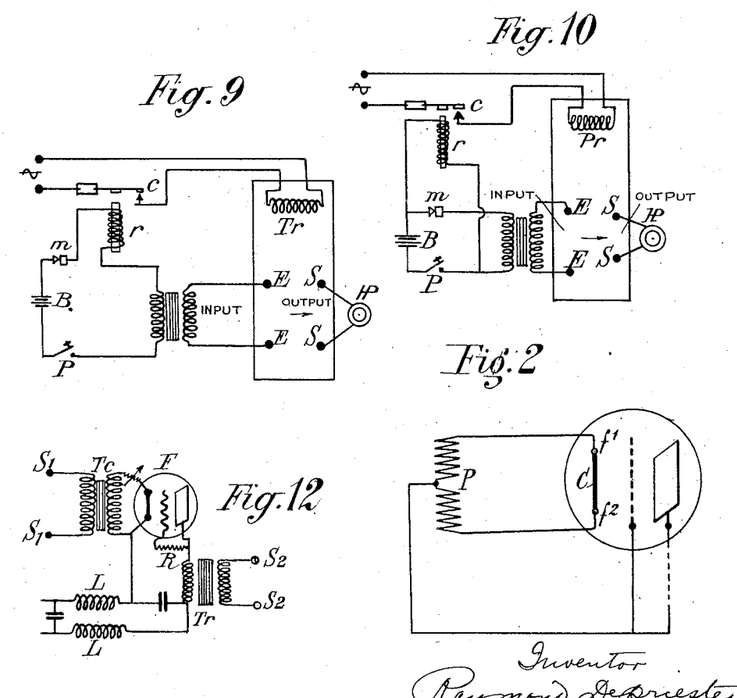
Fig. 2 is a modification of Fig. 1 and shows a detail of the filament circuit.
Figs. 9, 10 and 11 show relay systems for controlling the supply circuit for an amplifier.
Fig. 12 shows a rectifier for supplying energy to an amplifier.

If it is found by experiment that this point is located at P, Fig. 2, between the ends $f_1$ and $f_2$ of the cathode C, it is advisable to place the point P at the point of junction of two resistances $f_1$ P and P $f_2$ connected in series. Each of these resistances is, for example formed of a wire folded upon itself and wound as one, and thus has no self-induction. Good results can also be obtained by like means for reducing the apparent impedance of the arrangement for establishing the point of thermionic symmetry P. One can, for instance, use a potentiometer or tapped transformer shunted on the filament, provided it is shunted by condensers.

A third method consists in placing two filaments in series in the bulb, with an accessible point of junction, or further in using a pair of like audions with filaments in series.

But it should be observed that it is mainly the return circuit of the auxiliary anode termed the grid which should be connected to the point P.

Figure 3:
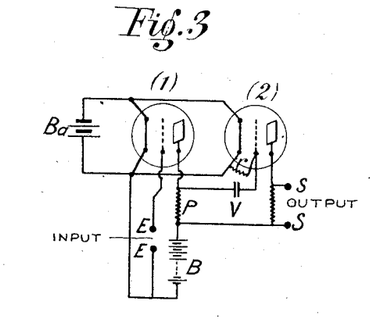
Fig. 3 is a further modification of Fig. 1 showing the use resistance coupling between amplifiers.

Among the advantages obtained by the said means enabling the elimination of the rumbling noise, must be mentioned the feasibility of operating without the usual coupling or blocking condenser in thermionic amplifiers whose several stages are connected by resistances. For this it suffices to effect the supply of the electrodes of the successive audions by independent sources of current, in the following ways:

Figure 3 represents an amplifier with two stages connected according to a known method by a resistance $\rho$ and a condenser $\gamma$. The potential difference to be amplified is brought to the input end of the apparatus (terminals E E) and the amplified currents appear at the output end (terminal S S). The connecting condenser $\gamma$ is essential, and it is further necessary to use a resistance $r$ of several megohms between the grid and the filament of the thermionic device 2 so that the mean current of the grid stopped by the condenser $\gamma$ shall be enabled to return to the filament.

If the filaments are to be heated by alternating current, it is necessary to replace the storage cells B $a$ by the transformer $T_R$ (Fig. 4) and to connect the common return of the grid circuits (polarized or biased by the resistance and condenser R C shown in Fig. 1) and the plate circuits to the point N near the middle of the secondary of this transformer. The impedance of the latter is neutralized by the condensers $c$ $c$ as above stated, provided its own capacity is not sufficient.

Figure 4:
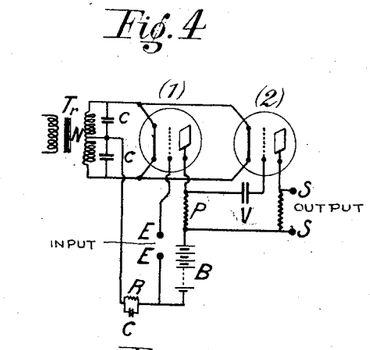
Fig. 4 shows the use of alternating current for energizing the filament circuit of the system shown in Fig. 3.
Figure 5:
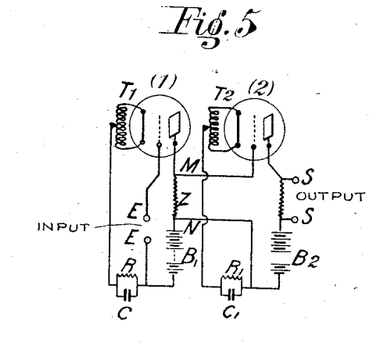
Fig. 5 shows an amplifying system in which separate energizing sources are employed for a plurality of stages of amplification.

In sum, to obviate the prejudicial effect of the external impedance of the filament-grid circuit due to the bending or distortion of the characteristic curve to the grid, I annul the mean grid-current, and am thus enabled to dispense with the resistance $r$. Should it also be desired to eliminate the connecting condenser $\gamma$ recourse must be had to the individual supply of the electrodes as shown in Fig. 5 which is economically feasible in the case of alternating current supply. Here, $T_1$ and $T_2$ are the secondaries of the individual supply transformers which may or may not have a common magnetic core. The coupling resistance $\rho$ of Figs. 3 and 4 is herein replaced by an impedance Z. This impedance should be arranged according to the following conditions:

1. There should be used an impedance for the frequency of the currents to be amplified of a value near that of the internal filament-plate resistance of the audion (e. g. 80.000 ohms).

2. This impedance is to have for the frequency of the power supply circuit a value which is as small as possible.

3. The said impedance should have as concerns continuous current, a minimum value in order that the mean plate current of the thermionic device 1 which causes a drop in potential on this impedance shall not too strongly polarize the grid of the lamp 2.

An impedance complying with the three conditions mentioned can be readily constructed. It may consist, for example, of an 80.000 ohm-resistance shunted upon a self-induction of small ohmic resistance, or a simple self-induction with suitable characteristics, or an auto-transformer, etc.

The above-mentioned system, Fig. 5, has, however, the drawback of requiring two anode-batteries $B_1$ $B_2$. These may also be replaced in each case by a rectifying audion succeeded by a filter.

Figure 6:
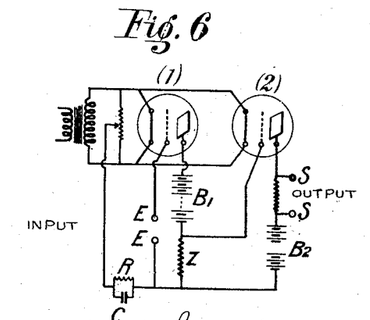
Fig. 6 is a modification of Fig. 5 in which a common filament energizing source is employed.

In Fig. 6 the anode battery B' is placed between the anode and the impedance coupling Z. I thus avoid the individual supply of the filaments, and the individual polarization of the grid; but the anodes must always be provided with their individual batteries $B_1$ $B_2$, or otherwise the plate currents of the two lamps would mingle and would both flow in the impedance A.

Figure 7:
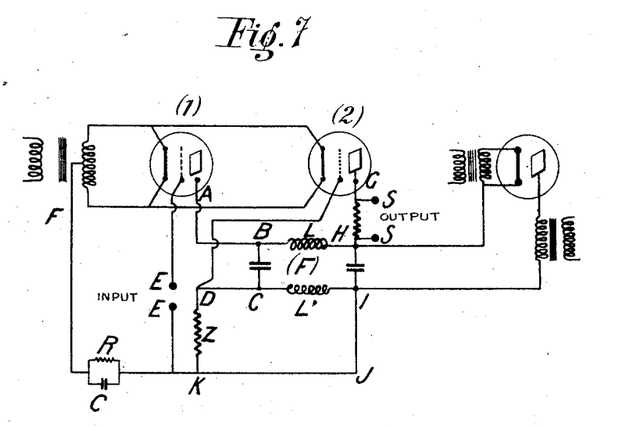
Fig. 7 is a further modification of Fig. 5 in which common filament and anode energizing sources are employed.

I further eliminate the batteries $B_1$ and $B_2$ (while at the same time not mingling the plate current) by using a filter, e. g. a filter F, Fig. 7 of the rectifying audion intended to replace the batteries $B_1$ and $B_2$. The alternating components of the two anodic currents will follow very different paths, i. e. A B C D K F and G H I J K F. In this last arrangement, the impedance Z which must always comply with the three stated conditions is shunted by the self-induction L' of the filter F. In some cases one can insert in the circuit I J K a condenser having a capacity such that it will arrest the wave currents from the rectifying audion but without preventing the normal flow of the amplified oscillations.

It should be noted that the said system is applicable in the case in which more than two stages are used, by augmenting, for example, the number of cells of the filter F. Obviously, the output impedance S S can also be disposed in the circuit I J K.

In what precedes, it has been made evident that it is necessary to give to the impedances of the external paths of the filament-grid circuits, to the coupling impedances, and to like parts, a value which is as small as possible as concerns the frequency of the current of power supply circuit. In practice these impedances should be small for all frequencies of the same order of magnitude as the frequency of the power supply.

The harmonics of the main line chiefly produce the parasitic noise. In order to eliminate the latter, it is advisable to connect to earth the filaments of the amplifying lamps or of the rectifying lamps of the different arrangements which are placed in series. The earth connection can be made either directly or through a condenser, for example by the capacity of the heating transformer itself, in which case it suffices to connect the main line or power supply current itself to ground, this being the fact often, incidentally.

I will now mention certain modifications of the impedance (Fig. 1) consisting of an ordinary resistance R shunted by a condenser C. This modification is shown at Y, Fig. 8. The said impedance R placed alone in the grid circuit will not allow a sufficient polarization. A shunted condenser will only act when the current in the grid is not null. The impedance is preferably placed in the common return of the grid circuit and the plate circuit to the cathode. On the other hand, this impedance Y acts as an automatic polarizer, i. e. the degree of polarization of the grids will augment when the plate tension or the heating increases, and this forms one of the advantages of the use of a shunted condenser instead of a battery. The impedance Y used as it is, is already of great utility for audions with alternating current supply and for oscillating audions (irrespective of their supply).

I will further indicate two other uses of the said impedance. If the resistance of the self induction coil of the oscillating circuit disposed in the plate circuit were null, the impedance (based on the frequency of the currents to be amplified) to be placed in the common return circuit in order to set up the production of oscillations should be a negative resistance. In the contrary case, using for the impedance an oscillating circuit whose proper period is adjustable, one may according as this oscillation circuit is adjusted above or below the resonance, set up or eliminate the regeneration effects or otherwise increase or diminish the amplification according to whether the resistance is positive or negative. Further, to suppress the noise of the rumbling current which may remain in the plate circuit, one can insert in this circuit a small E. M. F. (having the proper frequency, amplitude and phase) obtained by means of a potentiometer of the Drysdale type for example, but this will require a difficult and complicated adjustment. One may also insert in the common return of the anode circuits to the filament a stopping arrangement (or a number of the same in series) consisting of an impedance which is a maximum for the frequency of the main line. But the same stopping arrangement when inserted in the plate circuit alone will be much less effective.

It is thus observed that the impedance disposed in the common return circuit, instead of being a simple shunted condenser may consist of a combination impedance comprising resistances, self-inductions, capacities, mutual inductions, negative resistances, etc. such that the combination impedance network will have the proper value for the continuous current, for the frequency of the amplified currents and for frequencies near that of the main line.

Figure 8:
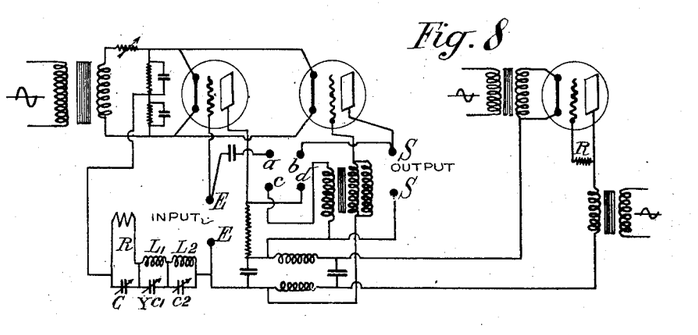
Fig. 8 shows the use of an impedance network for polarization of the grid electrode.

Figure 8 shows a simple arrangement of this kind of combination impedance. In series with the common return is placed an impedance Y comprising a condenser C, shunted by the resistance R and acting as an automatic polarizer of the grids; a stopping device $L_1 C_1$ to arrest the frequencies due to the main or power line, while the oscillating circuit $L_2 C_2$ is adjustable near the tuning point of the frequencies to be amplified according to the result to be obtained.

Mention will now be made of new methods for the alternating current supply of the audions when the latter are used in special arrangements, utilizing for example, the phenomena of regeneration and super-regeneration. The methods described and those which will be set forth hereinafter may obviously be used in combination or separately. As a rule, the above indicated methods, employed alone, will suffice for the following cases in which audions are used: amplifications (high and low frequency) without excessive reaction, generating and all cases resulting therefrom such as amplifying voltmeter, diminution-meter, etc.

The other uses of audions may be divided into two classes according to the cause of the rumbling noise.

The first class is characterized in that the rumbling or the parasitic rumbling noise is due to temperature variations of the cathode; this will require a modification of the said cathode.

I employ for this purpose: (1) cathodes operating at low temperatures. In this case it is necessary to use filaments covered with special oxides or specially treated in order that the indispensable electronic emission shall be produced at a low temperature. The oxide layer is also useful in augmenting the quantity of heat which can be stored up in the cathode. (2) Cathodes operating below the saturation temperature. In this case it is not desired to obviate temperature variations in the cathode, but to avoid the effects of such changes, and it suffices that the field produced at the cathode by the "space charge" of the electron shall be sufficient to counterbalance the action of the field produced by the anode.

The second class of apparatus requires the use of audions whose cathodes are almost equipotential, or more simply, audions provided with filaments, said audions being supplied at a very low tension, i. e. a fraction of a volt instead of 4 to 6 volts.

With low tension filaments (2.8 amperes at 1 volt) I use as the cathode, according to the invention, the standard filament of a lamp of the French military telegraph type (which may be characterized by its length of about 2.1 cm. and its consumption of about 0.7 amperes at 4 volts). The said filament is cut into four equal parts and these parts are supplied in parallel and not in series.

The objectionable noise can also be eliminated by a differential method to be hereinafter described, based upon the advantages of the individual supply of the audions or groups of audions in accordance with my invention, when this supply is used special transformers can be dispensed with. For this purpose it suffices to dispose a pair of like amplifiers, e. g. of the type shown in Fig. 1 in such manner that their incoming or input circuits shall be in series or parallel, the same being true for their outgoing or output circuits. Since the two amplifiers are alike the effects of the operative currents will be added together, but it suffices that the two supply wires (next the main line) of one amplifier be reversed in order that the two noises shall mutually neutralize.

As concerns the filtering effect, it is recognized that this can be readily obtained with high frequency amplifiers. But in the case of telephonic frequencies this is no longer the case.

According to the invention it is preferable to use in this case a filtering element having several cells and provided with self-induction coils having a sufficient time constant. This is the case for filters placed at the front and rear of the usual reversible telephone relays or repeaters which operate on continuous current and thus serve a double purpose.

One may also carry out the detection before filtering (sounds either telegraphic or speech).

I will further describe certain novel accessories which are of great utility in the operation of amplifiers which are supplied by alternating current and provide for the reception of telephone messages by loud-speaking apparatus, for instance in railroad switch and signal towers, noisy halls in which packages or apparatus are handled, and the like. For such installations and for other uses such as loud-speaking theatrophones, etc. it is advantageous to light the amplifying audions only for the duration of the messages. According to the invention, the action takes place upon the supply circuit, or on the side of the main line, and in this manner it is only required to break the circuit upon small currents (0.1 ampere at 110 volts for a two-stage amplifier of the low frequency type comprising three lamps of the French military telegraph type) and to cut off all the currents passing through the apparatus, by a single control operation.

For the present purpose, I may use, firstly, a simple switching device which is mechanically connected with the microphone pedal so that pressing on the pedal establishes the current of the microphone battery as well as the current of the main supply line in the respective circuits,—or, secondly, a relay switch. The latter has the advantage of entirely separating the wires of the main line from the wires of the telephone plant, and said apparatus consists for example of a simple electro-magnet whereof the armature operates to make or break the supply circuit of the amplifier and has its winding placed in series with the circuit of the microphone battery.

Figure 9 shows this arrangement comprising the alternating supply circuit, and the primary $P_r$ of the supply transformer. The relay switch $r$—$c$ closes this circuit when the microphone pedal P closes the local circuit of the battery B through the microphone $m$. H P represents the loud speaking device.

The winding $r$ subjected to the action of the mean microphone current should have a low resistance, or on the contrary I may use a high resistance winding, provided it is shunted upon the microphone battery in series with the pedal. This arrangement is shown in Fig. 10.

Obviously the said relay switch may be of any other type, or a perfected type (contact shunted by a condenser, or a device for cutting off the current when passing through zero in order to obviate the resulting sparks and noise, and like means), without departing from the principle of the invention.

In the same order of ideas, I also claim the use of a relay switch acting not under the influence of continuous current or a mean current which is not of a zero value, but in fact under the effect of a complex alternating current or the telephone current itself, before or after amplification, depending upon the force of the signals and the sensitiveness of the said relay switch. By way of example which is not of limitative nature, I will describe below an inter-urban telephone plant provided with a unilateral or one-way amplifier (supplied with alternating current) and effecting a bi-lateral or two-way amplification without requiring the use of a reversible arrangement wherein are employed natural or artificial equilibrating means or lines which are much weakened.

Figure 11:
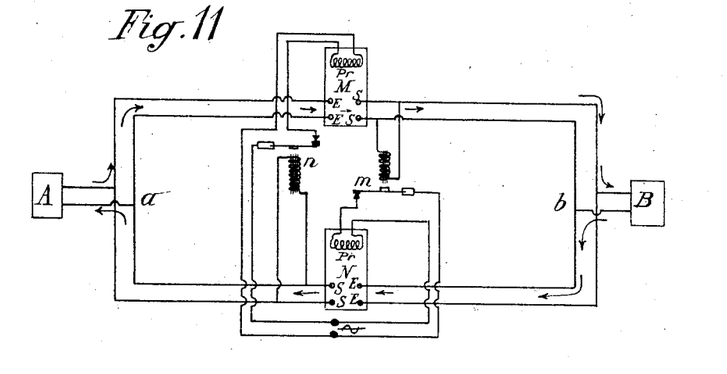

Figure 11 shows two subscribers' stations A and B which are connected to an interurban four-wire system by the usual two-wire lines. The conversation from A to B (in which A speaks and B listens) take place on the line A M B and are amplified by the amplifier M. The conversations held from B to A (B speaking and A listening) take place on the line B N A, and are amplified by the amplifier N. It is recognized that a system of this kind which is unprovided with special devices at $a$ and $b$ will start into oscillation or produce a howler effect (with the two amplifiers in series in the inter-urban section $a$ M $b$ N $a$) if the total resistance of this circuit is less than that required to overcome the amplifying action, which is the general rule.

But in my invention, I prevent this starting into oscillation since the two relay switches $m$ and $n$ are so disposed that the two amplifiers are never lighted at the same time. In fact, if A speaks, the currents due to the conversation, after having been amplified by the amplifier M, will act upon the armature of the relay switch $m$, thereby extinguishing the amplifier N. In like manner, if B speaks, the switch $n$ will extinguish M.

If neither of the subscribers is speaking, it is obvious that both amplifiers will be lighted and that the system may be started into oscillation; but this starting will actuate the relay switches, and will be self-suppressed by extinguishing the amplifiers, whereupon the phenomena will recommence according to the same cycle of operations.

This drawback may be obviated by mechanically connecting the two armatures of the relay switches together in such manner that the two contacts can never take place at the same time, or further by an electrical combination of the circuits comprising the two contacts with which may be used all the current combination for double lighting, such as a reciprocating action, and the like.

The wires connecting $a$ to $b$ may obviously consist of simple connecting wires of short length, without being interurban circuits; in this case, Figure 11 shows a reversible amplifier for usual two-wire lines.

Lastly, I will give some precise data as to the conditions for the use of amplifying lamps with alternating current supply in accordance with the methods and arrangements hereinbefore set forth. This method of supply offers combinations which are of value in practice, and for example, it provides for the combination of amplifying devices in pairs for high or low frequency in a device provided with an individual rectifier or valve and an individual supply transformer. If the first device amplifies the high frequency currents without detecting the same, and if it is followed by a low-frequency device, it is simply necessary to replace one of the two conductors connecting the said devices by a detector of any suitable type, for instance a crystal detector.

When a loud speaking action is to be obtained, the first device is followed, not by a second device, but by 2, 4, 8, 16, 32 devices similar to the first connected in parallel, and each device cooperating with an individual loud-speaking apparatus.

In order to counteract the regenerative effects which would always tend to be produced in the case of strong amplifiers, one may connect together (by an equilibrating or neutralizing wire) the filaments of the amplifiers or of the rectifiers of the several devices, of two such devices for example, which are connected in series, or otherwise one may connect the said filaments to earth (as stated), or further one may connect one of the low tension secondaries of the supply transformers of the amplifying devices to the primary on the side next the main line. The simple expedient of employing supply transformers with high magnetic leakage will also render the heating current of the filament more or less independent of the ohmic resistance.

To counteract the objectionable effect of voltage variations on the main line, I utilize a single rheostat or a self-induction coil with a variable number of turns or with a movable core, or again a transformer acting to raise or lower the voltage and having a variable ratio of transformation, or like arrangement acting upon the primaries (on the side of the main line) on the supply transformer of the said devices. With this arrangement I am enabled to act simultaneously and by a single control movement upon all the heating circuits of the filaments of the amplifying and rectifying lamps.

One may also employ supply transformers of the compound type, i. e. producing a secondary current which is practically independent of the primary voltage and whereof the compound winding can be readily determined. Figure 8 shows an amplifier comprising as usual two amplifying and one rectifying lamp, but various combinations of R F and A F amplification. Four terminals $a, b, c\, d$ disposed in a square are used according as the detector is connected to one or another of the four corners of the square to produce between the input terminals E E and the output terminals S S of the apparatus the following combinations:

(1) 1 R F—1 A F galena or like detector at $c\, d$.

(2) 1 R F galena or like detector at $b\, d$.

(3) 1 A F galena or like detector at $a\, c$.

(4) Simple detection galena or like detector at $a\, b$.

By a series arrangement in groups, I may provide for all the possible combinations (odd or even) of 0 to 6 stages of amplification.

It is also feasible to modify the arrangement of the rectifier F shown in Figure 1.

This rectifier or valve may consist of a simple three-electrode thermionic device. But when using such devices care must be taken, in order to obviate imperfect action of the transformer $T_r$, Figure 12 to connect the grid with the plate through a protecting resistance R which comes into action in case the filament comes accidentally into contact with the plate. If the said resistance is high, it will also aid in rendering the plate voltage (supplied to the amplifying lamps) more or less independent of the main line voltage.

In the case of amplifiers comprising a great number of lamps which do not employ the grouping of the lamps in pairs, a lamp with high saturating current must be employed as a rectifying valve.

By the use of the principle as above described for the supply of the electrodes by individual transformers, I am enabled to arrange in series (and not in parallel) the filament-plate spaces of the audions constituting the successive stages of the said amplifiers, thus employing solely a rectifying valve of small output. By means of the individual supply of the several amplifiers of a station comprising telephone repeaters, I am enabled to eliminate with facility the cross-talk between relays, whereby a considerable simplification of the actual installation of the said relays can be afforded.

I claim:

1. In a circuit arrangement utilizing alternating current for the supply of an audion having cathode, grid and anode elements, a differentiating impedance network for negatively polarizing the grid element differentially with respect to different components of the output circuit comprising a resistance shunted by a condenser and a self inductance shunted by a condenser placed in the common return circuit from the filament to the grid and plate and receiving current only through the audion.

2. In a circuit arrangement utilizing alternating current for the supply of audions having cathode, grid and anode elements, an impedance network connected in the common return circuit of the grid and anode to the cathode comprising a resistance shunted condenser, a stopping or filter circuit for arresting the oscillations due to the said alternating current supply, and an adjustable oscillating circuit.

3. In a circuit arrangement utilizing alternating current for the supply of the anode circuit and for heating the cathode of an audion having cathode, grid and anode elements, means selectively responsive to the heating current frequency for negatively polarizing the grid element of said audion, said means being connected in the common return circuit of the grid and anode of said audion.

4. In a circuit arrangement utilizing alternating current for the supply of an audion having cathode, grid and anode elements the combination of a source of alternating current, grid and plate circuits associated with said audion and a plurality of filter circuit sections in said grid circuit, one thereof being tuned to the alternating supply current frequency.

5. In a circuit arrangement utilizing alternating current for the supply of an audion having cathode, grid and anode elements, the combination of a source of current for the supply thereof, grid, plate and filament circuits and means in said grid circuit resonant to the frequency of the power supply currents.

6. In a circuit arrangement utilizing alternating current for the supply of an audion having cathode, grid and anode elements the combination of a source of current for the supply thereof, comprising a transformer having a plurality of secondary windings, one thereof being connected to said cathode and another thereof being connected to said anode through a rectifier and filter system, and means comprising an impedance common to circuits connected to said cathode, grid and anode elements for producing a bias on said grid, and an auxilary resonant impedance also connected in said common circuit.

7. In a circuit arrangement utilizing alternating current for the supply of an audion having cathode, grid and anode elements, the combination of a source of current for the supply thereof connected to said cathode, and to said anode through a rectifier and filter system, means comprising a tunable impedance in the grid circuit adapted to produce a bias upon said grid, a transformer having a primary winding and a secondary winding as said source of current, and a relay having its contacts connected in the primary circuit of said transformer.

8. In a circuit arrangement utilizing alternating current for the supply of an audion having cathode, grid and anode elements, the combination of a source of current for the supply thereof connected to said cathode and to said anode through a rectifier and filter system, means comprising a tunable impedance in the grid circuit adapted to produce a bias upon said grid, a transformer having a secondary winding as said source of current, and a relay in the primary circuit of said transformer, and means responsive in accordance with signals in said circuit arrangement for actuating said relay.

9. In a circuit arrangement utilizing alternating current for the supply of audions having cathode, grid and anode elements, the combination of sources of current for the supply thereof, comprising transformers having primary and secondary windings, connections from said secondary windings to said filaments and to said anodes through rectifier and filter elements, said audions being adapted to repeat vibratory currents in adjacent circuits passing in opposite directions and relays respectively associated with said power sources of said audions, and means comprising connections from the output circuit of one audion to the relay associated with the other whereby output currents in one audion will actuate the relay associated with the other audion.

RAYMOND DEPRIESTER.